(12) United States Patent
Chuo

(10) Patent No.: US 8,893,570 B2
(45) Date of Patent: Nov. 25, 2014

(54) BALL SCREW WITH AN OIL-STORAGE UNIT

(75) Inventor: Yung-Tsai Chuo, Taichung (TW)

(73) Assignee: Hiwin Technologies Corp., Taichung Industry Park, Taichung (TW)

( * ) Notice: Subject to any disclaimer, the term of this patent is extended or adjusted under 35 U.S.C. 154(b) by 160 days.

(21) Appl. No.: 13/535,442

(22) Filed: Jun. 28, 2012

(65) Prior Publication Data

US 2012/0266703 A1 Oct. 25, 2012

Related U.S. Application Data

(63) Continuation-in-part of application No. 12/214,817, filed on Jun. 23, 2008, now abandoned, which is a continuation of application No. 11/091,802, filed on Mar. 28, 2005, now abandoned.

(51) Int. Cl.

| F16H 3/06 | (2006.01) |
|---|---|
| F16H 27/02 | (2006.01) |
| F16H 29/02 | (2006.01) |
| F16H 29/20 | (2006.01) |
| F16H 57/04 | (2010.01) |
| F16H 25/22 | (2006.01) |

(52) U.S. Cl.
CPC ........ *F16H 57/0497* (2013.01); *F16H 25/2204* (2013.01); *F16H 57/045* (2013.01)
USPC ................... 74/89.44; 74/424.71; 74/424.81; 184/5

(58) Field of Classification Search
CPC . F16H 25/2204; F16H 25/2418; F16H 25/20; F16H 25/2214; F16H 25/24; F16H 25/2219; F16H 57/045; F16H 57/0406; F16H 57/0497

USPC .................. 74/89.4–89.45, 424.71–424.79, 74/424.81–424.86; 184/5, 101

See application file for complete search history.

(56) References Cited

U.S. PATENT DOCUMENTS

| 3,132,719 A * | 5/1964 | Cole ............................... 184/65 |
| 6,220,110 B1 * | 4/2001 | Yang et al. ................. 74/424.87 |
| 6,364,058 B1 * | 4/2002 | Nishide et al. .................... 184/5 |
| 6,619,148 B2 * | 9/2003 | Nishide ........................ 74/89.44 |
| 6,634,246 B2 * | 10/2003 | Ohya et al. ................... 74/89.44 |
| 7,788,987 B2 * | 9/2010 | Chen et al. ................... 74/89.44 |
| 8,302,499 B2 * | 11/2012 | Chen et al. ................... 74/89.44 |
| 2006/0169075 A1* | 8/2006 | Chuo ............................ 74/89.44 |
| 2008/0134816 A1* | 6/2008 | Chen et al. ................... 74/89.44 |
| 2008/0257082 A1* | 10/2008 | Chuo ............................ 74/89.44 |
| 2009/0133520 A1* | 5/2009 | Chen et al. ................... 74/89.44 |
| 2012/0266703 A1* | 10/2012 | Chuo ............................ 74/89.44 |

* cited by examiner

*Primary Examiner* — Troy Chambers
*Assistant Examiner* — Alexander Vu
(74) *Attorney, Agent, or Firm* — Charles E. Baxley

(57) ABSTRACT

A ball screw with an oil-storage unit, the oil-storage unit includes an oil tank and a connector. The connector has one end formed in the form of a convex or concave structure, and the connecting end of the oil tank is also in the form of a concave or convex structure for engaging with the connector, so as to achieve quick assembling of the connector onto the oil tank through the engagement of the convex and concave structures. Since the oil-storage unit can be quickly replaced after the oil is used up, which provides an automatic and continuous self-lubricating function to the ball screw, and consequently extending the service life of the ball screw.

7 Claims, 14 Drawing Sheets

BALL SCREW WITH AN OIL-STORAGE UNIT

CROSS REFERENCE TO RELATED APPLICATIONS

The instant patent application is a continuation in part of U.S. patent application Ser. No. 12/214,817, filed on Jun. 23, 2008, abandoned on Sept. 27, 2012, and which is a continuation of U.S. patent application Ser. No. 11/091,802, filed on Mar. 28, 2005, and abandoned on Sept. 30, 2008.

BACKGROUND OF THE INVENTION

1. Field of the Invention

The present invention relates to a ball screw with an oil-storage unit, and more particularly to an oil storage unit which can be quickly assembled onto the ball screw to provide an automatic and continuous self-lubricating function to the ball screw.

2. Description of the Prior Art

Ball screw is used for motion transmission by taking use of the relative motion between its nut and screw shaft, the movement of the nut is realized by the rolling motion of the rolling elements between the nut and the screw shaft, so that the ball screw has a high efficiency of mechanical transmission. However, if the ball screw has not been lubricated enough for a long period of time, it may result in an increase in friction between the nut and the screw shaft, thus accelerating the abrasion of the ball screw. Hence, self lubricating function of a linear guideway has become more and more important. So far, the self-lubricating methods are generally divided into two types: the first method is to fix the lubricating system at both ends of the nut, lubricating oil is stored in the lubricating system, and then an oil absorbing material is used to smear the lubricating oil to the surface of the screw shaft. Another method is to fix an oil-absorbing material made wiper at either side of the nut, lubricating oil is stored in the oil absorbing material, and the oil absorbing material keeps contacting the surface of the screw shaft, so as to lubricate the teeth of the screw shaft, so that the rolling elements can be lubricated indirectly when rolling through the teeth of the screw shaft.

Both of these two methods are to lubricate the teeth of the screw shaft, and then the rolling elements only can be lubricated indirectly by the lubricating oil left on the screw shaft when rolling through the teeth of the screw shaft, therefore, the rolling elements may not be evenly lubricated, and it will cause waste of lubricating oil. In addition, both of the above-mentioned oil absorbing material and the oil-storage unit only can store a small amount of oil, so the lubrication effect will not last for a long time. However, the service life of the linear guideway is 5-10 years or above, as a result, the rail of the linear guideway will be spoiled ahead of its service life time, due to lack of lubrication. On the other hand, it will be time-consuming and difficult when the oil absorbing material and the oil-storage unit are assembled to or disassembled from the sliding block since they are fixed by screwing method.

FIG. 14 shows another conventional ball screw 2 with an oil-storage unit 1, wherein the oil-storage unit 1 is formed with an oil feeding hole 11 in communication with an oil-storage space 12. A connector 3 formed with an oil feeding hole 301 has one end connected to the nut 201 and another end connected to the oil feeding hole 11 of the oil-storage unit 1, so that lubricant oil can be transported to the nut 201 by the connector 3. However, the connector 3 cannot be positioned by itself and needs to be fixed by using a spring 4 to push the end of the connector 3, and then a screw 5 is used to fix the spring 4, rendering this oil-storage unit 1 relatively inconvenient to assemble and disassemble.

FIG. 15 shows another conventional ball screw shaft 90 on which is movably disposed a reciprocating platform 91, a motor 93 controlled by a numerical control device 92 rotates the screw shaft 90 so as to cause reciprocating motion of the reciprocating platform 91 with respect to the screw shaft 90. The method for lubricating the screw shaft 90 is such that the lubricant oil is pumped by a pump 94 from an oil-storage unit 96 to an oil feeding hole 951 of a connecting pipe 95, and then the lubricant oil drops to an oil receiving hole 901 of the screw shaft 90 to lubricate the screw shaft 90. The oil-storage unit 96 and the connecting pipe 95 are independent structures from the screw shaft 90 and therefore are inconvenient to assemble and space consuming. Furthermore, the lubricant oil is likely to leak out and cause environmental contamination if the oil-storage unit 96 and the connecting pipe 95 are not well designed and assembled.

The present invention has arisen to mitigate and/or obviate the afore-described disadvantages.

SUMMARY OF THE INVENTION

The primary object of the present invention is to provide a quick-replaceable oil-storage unit for a ball screw, so as to provide an automatic and continuous self-lubricating function to the ball screw.

In order to considerably increase the oil storage capacity, making the self-lubricating last longer, and in order to enable the oil-storage unit to be easily assembled on the nut, firstly, the oil tank is designed to have an oil-storage space and a penetrating hole in communication with the oil-storage space. Secondly, the present invention is provided with a connector including a first end, a second end and an oil feeding hole running through the first and second ends. The first end is inserted in the axial direction and into the fixing hole of the nut, the second end is connected to the connecting end of the oil-storage unit, and the oil feeding hole has two ends in communication with the oil-storage space and the fixing hole respectively. The second end of the connector is in the form of a convex structure or a concave structure for engaging with the connecting end of the oil tank, so as to make the oil tank fixed to the connector.

Furthermore, in order to enable the oil-storage unit to be easily assembled on the nut, the oil tank is provided with two hooks extending in the axial direction, and the nut is formed on an outer surface thereof with two locking cavities for engaging with the two hooks, so as to achieve quick assembling of the connector onto the oil tank through the engagement of the convex and concave structures. Since the oil-storage unit can be quickly replaced after the oil is used up, which provides an automatic and continuous self-lubricating function to the ball screw, and consequently extending the service life of the ball screw.

In considering the independent replaceability of the oil-storage unit, the oil-storage space of the oil tank is designed to be a sealed space in such a manner that the connecting end of the oil tank is sealed with a film, a ball or a spring plug, and the connector is designed to have a convex structure. When the connector is assembled to the oil tank, the film, spring plug, ball can be pierced through or pushed away by the convex structure to let the oil-storage space of the oil tank communicate with the fixing hole of the nut.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
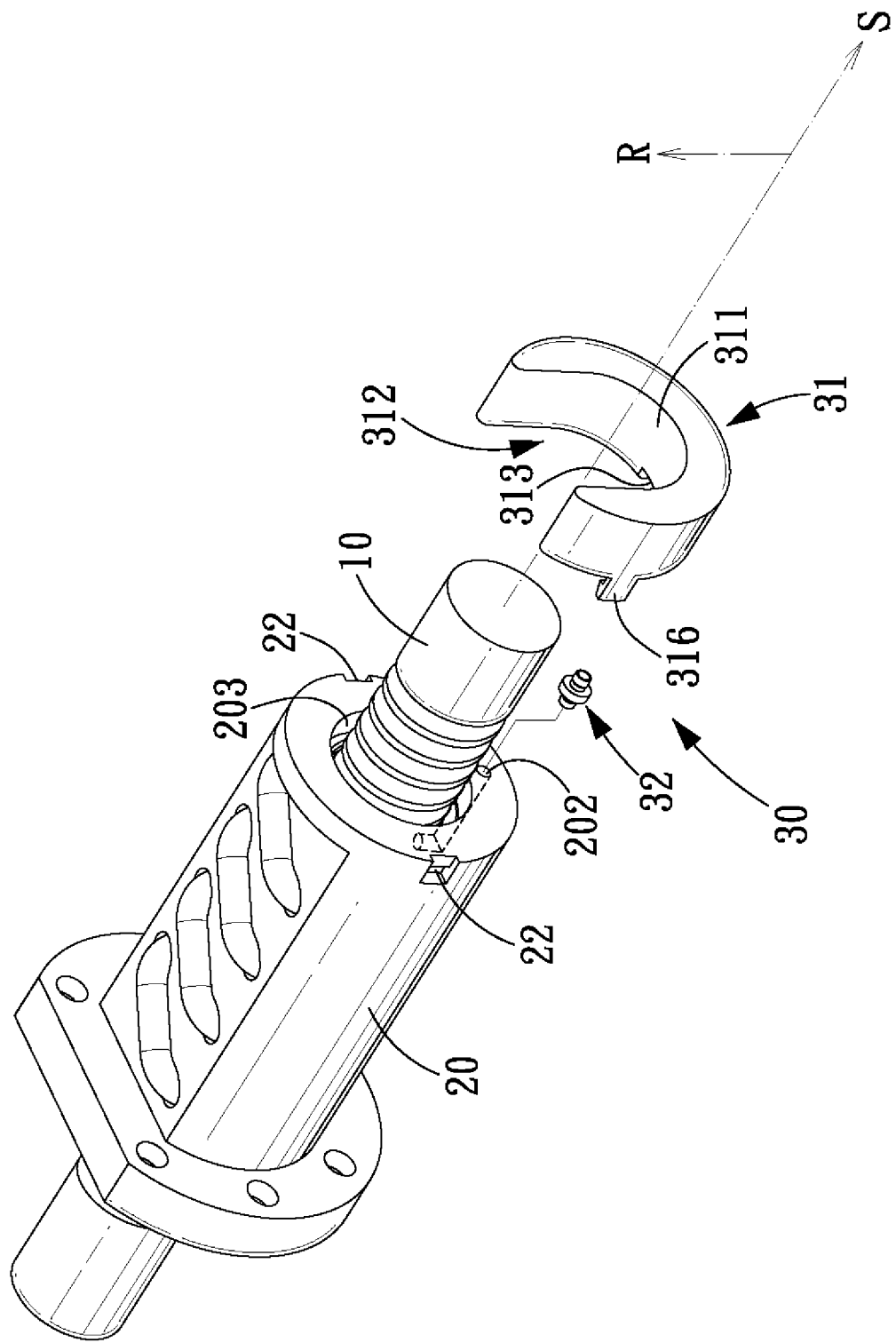
FIG. 1 is an exploded view of a part of a ball screw with an oil-storage unit in accordance with the present invention.
Figure 2:
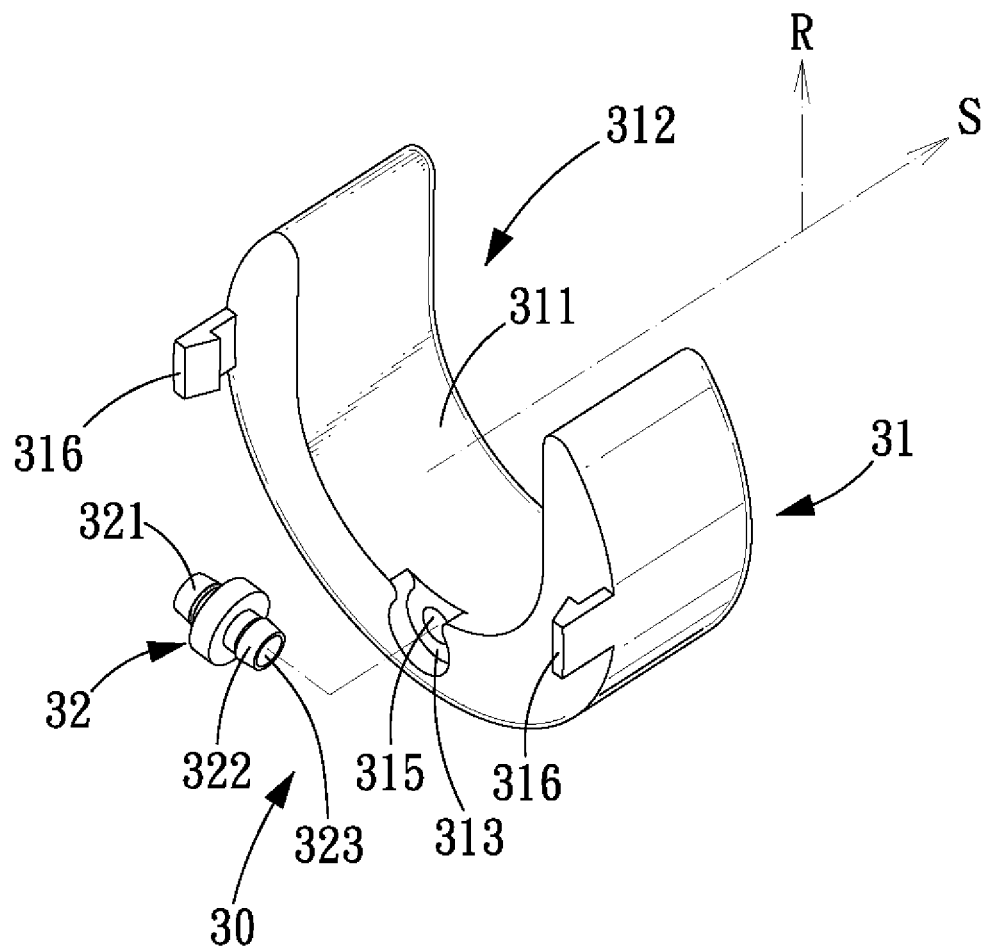
FIG. 2 is an exploded view of an oil tank and a connector in accordance with the present invention.
Figure 4A:
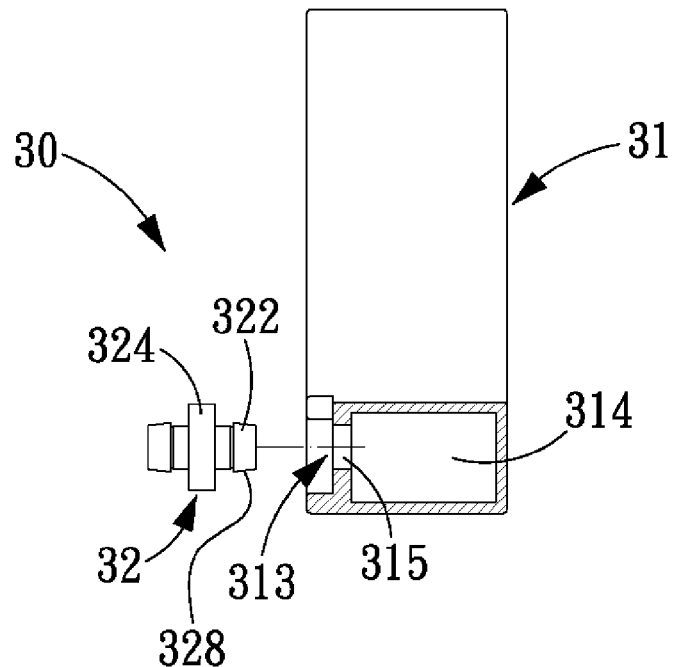
FIG. 4A is an exploded cross sectional view of the connector and the oil tank of the present invention.
Figure 4B:
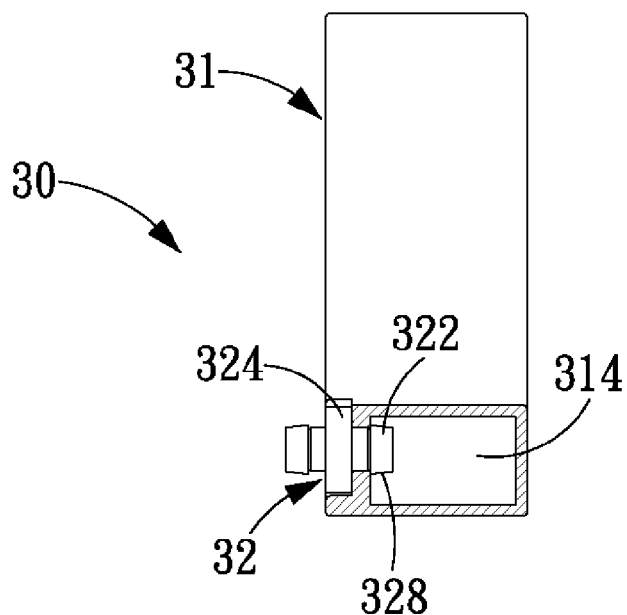
FIG. 4B is a cross sectional view showing that the connector and the oil tank of the present invention are assembled together.

FIG. 1 is an exploded view of a part of a ball screw with an oil-storage unit in accordance with the present invention, and FIG. 2 is an exploded view of an oil tank and a connector in accordance with the present invention. The ball screw with an oil-storage unit in accordance with the present invention comprises a screw shaft 10 and a nut 20. The screw shaft 10 extends in a direction to form an elongated structure, and the direction in which the screw shaft 10 extends is defined as an axial direction S. The screw shaft is formed on an outer surface thereof with an outer helical groove. The nut 20 is formed with a threaded hole 203 for enabling the nut 20 to be screwed on the screw shaft 10, and a L-shaped fixing hole 202 (as shown by the dotted line) which is formed at an end surface of the nut 20 and extends in the axial direction S is in communication with the threaded hole 203. The nut 20 is provided with an oil-storage unit 30 which comprises an oil tank 31 and a connector 32. The oil tank 31 includes a mounting hole 311, a gap 312, a connecting end 313 and an oil-storage space 314 (as shown in FIGS. 4A, 4B). The mounting hole 311 extends in the axial direction S to penetrate the oil tank 31, and a direction normal to the axial direction S is defined as a radial direction (as indicated by the arrow R). The gap 312 is formed by removing a radial part of the oil tank 31 and is in communication with the mounting hole 311. The gap 312 has a width larger than an outer diameter of the screw shaft 10. The connecting end 313 is in the form of a concave structure or a convex structure disposed at an end surface of the oil tank 31 (the connecting end 313 in this embodiment is a concave structure) and formed in the axial direction with a penetrating hole 315 in communication with the oil-storage space 314. The connector 32 includes a first end 321, a second end 322 and an oil feeding hole 323 running through the first and second ends 321, 322. The first end 321 is inserted in the axial direction and into the fixing hole 202 of the nut 20, and the second end 322 is connected to the connecting end 313 of the oil-storage unit 30. The oil feeding hole 323 has two ends in communication with the oil-storage space 314 and the fixing hole 202, respectively. By such arrangements, oil can from the oil tank 31 of the oil-storage unit 30 can flow to and lubricate the nut 20 automatically. The oil tank 31 is provided with two first positioning portions 316 extending in the axial direction (the first positioning portions 316 are in the form of a hook in this embodiment). The nut 20 is also formed on the outer surface thereof with two second positioning portions 22 (which are locking cavities in this embodiment, for example) for engaging with the first positioning portions 316.

Figure 3:
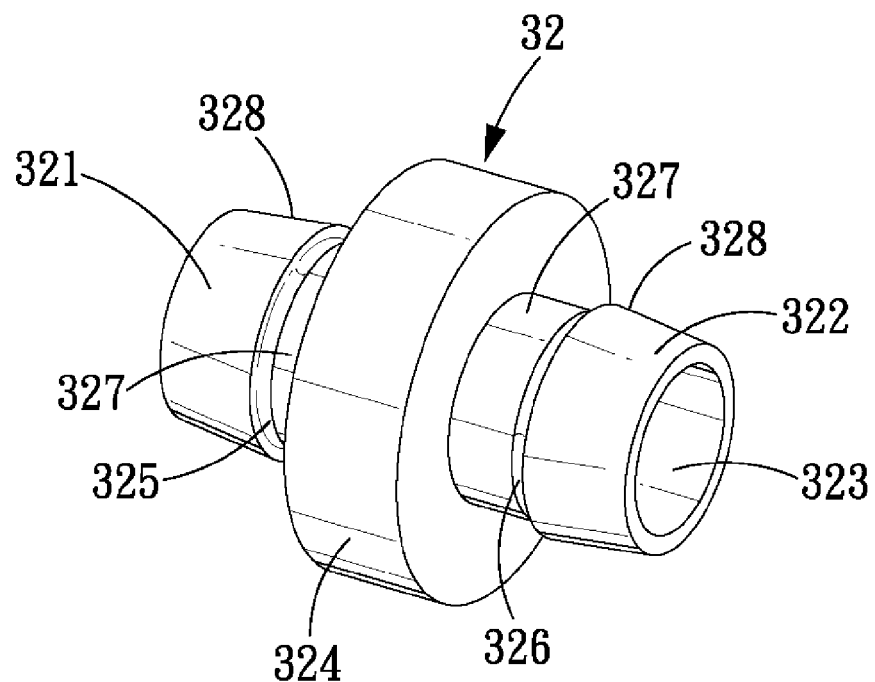
FIG. 3 is an illustrative view of a connector in accordance with the present invention.
Figure 3A:
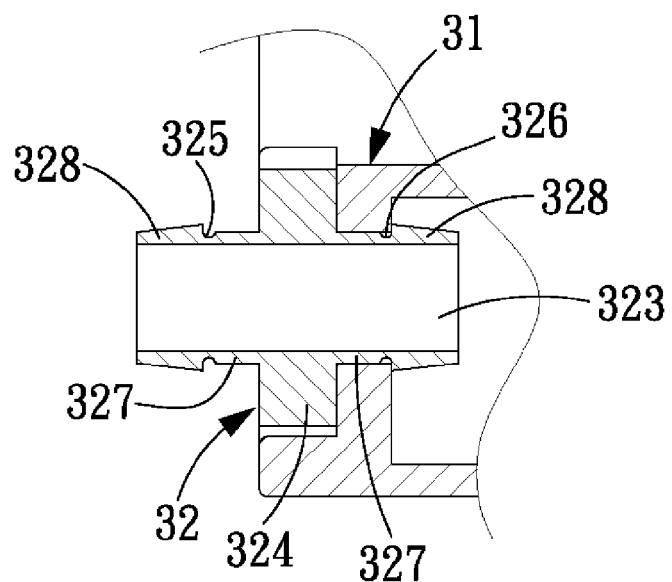
FIG. 3A is a cross sectional view showing that the connector is connected to the oil tank.

FIG. 3 is an illustrative view of a connector in accordance with the present invention. FIG. 3A is a cross sectional view showing that the connector is connected to the oil tank. The second end 322 of the connector 32 is in the form of a convex structure or a concave structure (in this embodiment, the second end 322 is a convex structure) for engaging with the connecting end 313 of the oil tank 31 (in this embodiment, the connecting end 313 is a concave structure), so as to make the oil tank 31 fixed on the connector 32. Moreover, the first end 321 of the connector 32 and the fixing hole 202 of the nut 20 can also be in the form of convex and concave structures for engaging with each other (the first end 321 of the connector 32 in this embodiment is a convex structure, for example), so as to fix the connector 32 to the nut 20. It is to be noted that the connector 32 in this embodiment is made of metal, and the oil tank 31 is made of plastic. Between the first and second ends 321, 322 of the connector 32 is formed a flange 324, and around the first and second ends 321, 322 is formed an annular groove 325, 326, respectively. The annular groove 325, 326 divides the first and second ends 321, 322 into a first part 327 and a second part 328, respectively, and the first part 327 which is located adjacent to the flange 324 has an outer diameter smaller than that of the second part 328 which is located further away from the flange 324 than the first part 327. Hence, when the first parts 327 of the first and second ends 321, 322 of the connector 32 are inserted in the fixing hole 202 of the nut 20 and the penetrating hole 315 of the oil-storage space 314, respectively, the second parts 328 of the first and second ends 321, 322 can prevent the disengagement of the first parts 327 from the fixing hole 202 of the nut 20 and the penetrating hole 315 of the oil-storage space 314.

Figure 11:
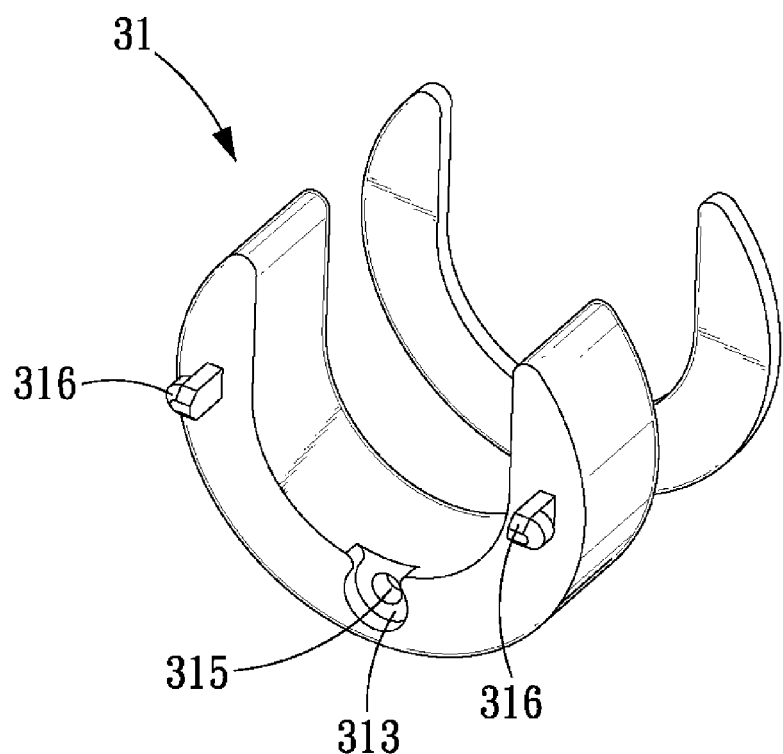
FIG. 11 is an exploded view of an assembled oil tank of the present invention.
Figure 12:
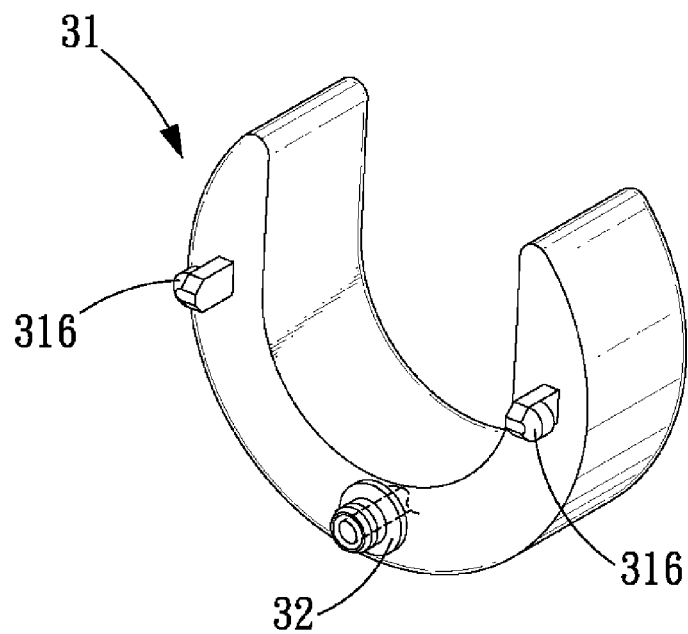
FIG. 12 shows an integrally formed oil tank of the present invention.

FIG. 11 is an exploded view of an assembled oil tank of the present invention, and FIG. 12 shows an integrally formed oil tank of the present invention. The oil tank 31 of the present invention can be a unitary structure or can be formed by several parts which are bonded together to form the oil tank 31 by ultrasonic bonding, friction bonding, hot melt or glue.

FIG. 4A is an exploded cross sectional view of the connector and the oil tank of the present invention, and FIG. 4B is a cross sectional view showing that the connector and the oil tank of the present invention are assembled together. The second part 328 of the second end 322 of the connector 32 which is made of metal and relatively hard can be inserted through the penetrating hole 315 of the relatively soft oil tank 31 which is made of plastic and then locked against the edge of the penetrating hole 315, so as to fix the connector 32 to the oil tank 31.

Figure 5A:
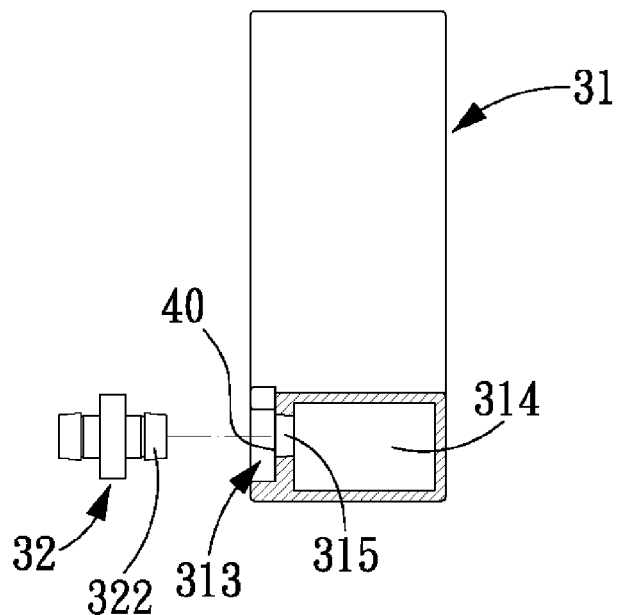
FIG. 5A is an exploded cross sectional view of the connector and an oil thank sealed with a film in accordance with the present invention.
Figure 5B:
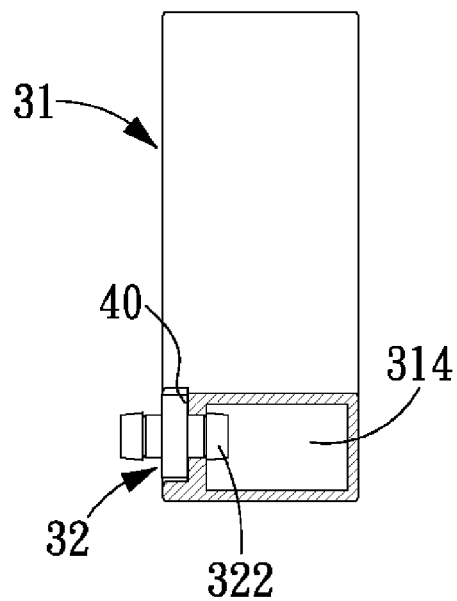
FIG. 5B is an assembly cross sectional view showing that the connector is assembled to the oil thank of the present invention.

FIG. 5A is an exploded cross sectional view of the connector and an oil thank sealed with a film in accordance with the present invention, and FIG. 5B is an assembly cross sectional view showing that the connector is assembled to the oil thank of the present invention. The penetrating hole 315 of the oil tank 31 of the oil-storage unit 30 is sealed with the film 40. The second end 322 of the connector 32 will pierce through the film 40 when it is inserted in the connecting end 313 of the oil tank 31, so that the oil feeding hole 323 of the connector 32 is in communication with the oil-storage space 314 of the oil tank 31.

Figure 6:
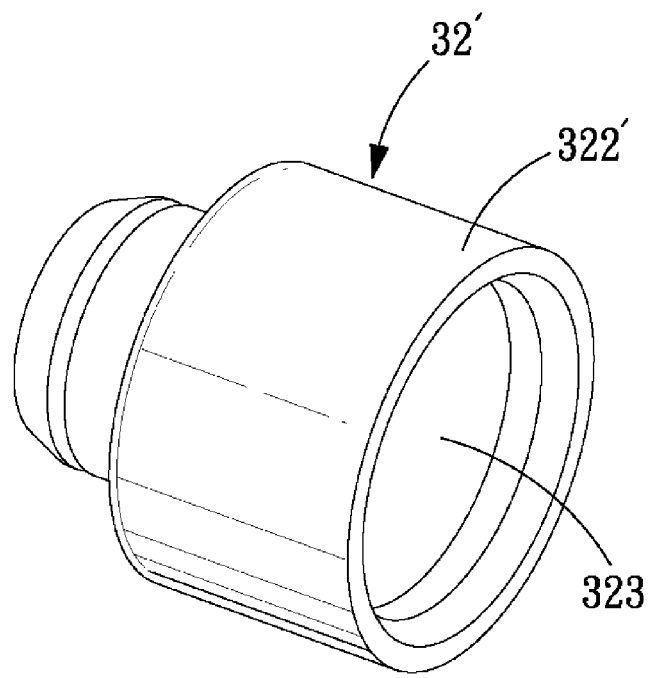
FIG. 6 shows a connector in accordance with a second embodiment of the present invention.
Figure 6A:
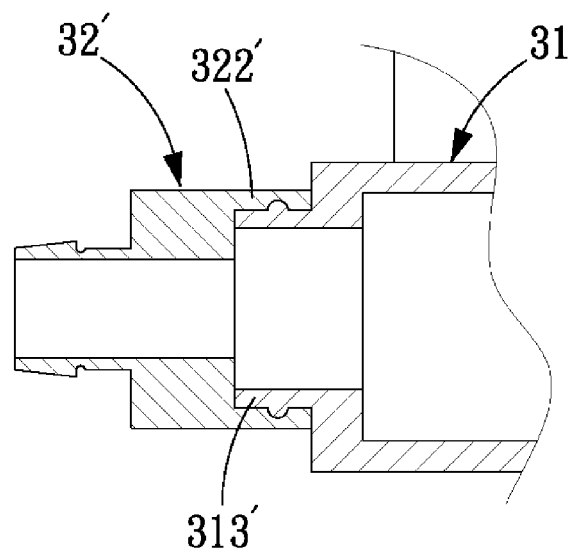
FIG. 6A is a cross sectional view showing that the connector is assembled to the oil tank.

FIG. 6 shows a connector in accordance with a second embodiment of the present invention, and FIG. 6A is a cross sectional view showing that the connector is assembled to the oil tank. The second end 322' of the connector 32' is an annular concave structure for mating with the connecting end 313' of the oil tank 31 which is an annular convex structure, so as to fix the oil tank 31 to the connector 32'. Or, the second end 322' of the connector 32' can an annular convex structure, while the connecting end 313' of the oil tank 31 can be an annular concave structure.

Figure 7:
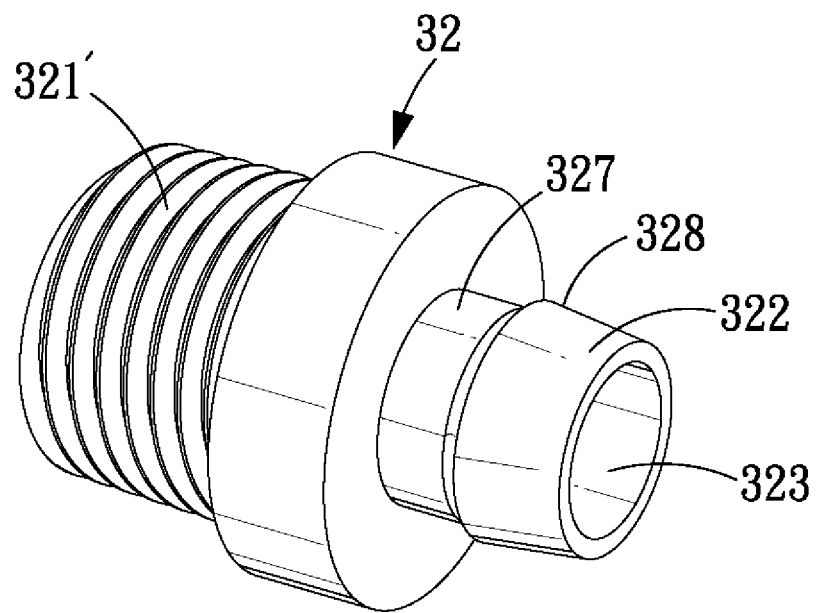
FIG. 7 shows a connector in accordance with a third embodiment of the present invention.

FIG. 7 shows a connector in accordance with a third embodiment of the present invention, wherein the second end 322 of the connector 32 is same as in FIG. 3 and also in the form of a convex structure for engaging with the connecting end 313 of the oil tank 31 which is in the form of a concave structure. However, the difference is that the first end 321' of the connector 32 in this embodiment is formed with outer threads for mating with inner threads formed in the fixing hole 202 of the nut 20. By such arrangements, the connector 32 can be fixed to the nut 20.

Figure 8:
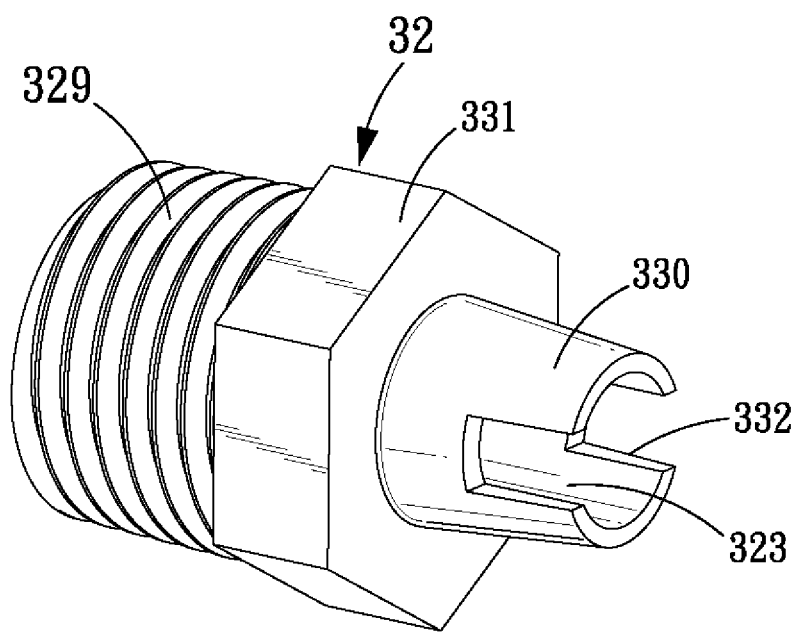
FIG. 8 shows a connector in accordance with a fourth embodiment of the present invention.

FIG. 8 shows a connector in accordance with a fourth embodiment of the present invention, wherein the first end 329 of the connector 32 is formed with outer threads for mating with inner threads of the fixing hole 202 of the nut 20, so as to fix the connector 32 to the nut 20. The second end 330 of the connector 32 of this embodiment is a tubular convex structure formed with a flange 331, and around the periphery of the second end 330 is formed a plurality of notches 332 (there are two notches 332 in this embodiment) for allowing oil to flow out. The first end 329 of the connector 32 can be screwed with the nut 20, and the second end 330 in the form of a tubular convex structure can be inserted in the penetrating hole 315 of the connecting end 313 of the oil tank 31, so as to provide quick connection through the engagement of the convex and concave structures.

Figure 9A:
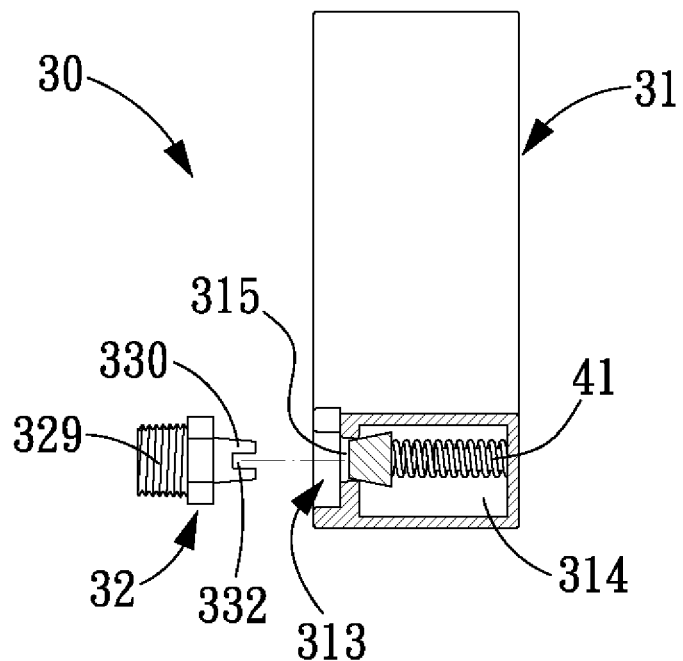
FIG. 9A is an exploded cross sectional view in accordance with the present invention showing a connector and an oil tank which is provided with a spring plug.
Figure 9B:
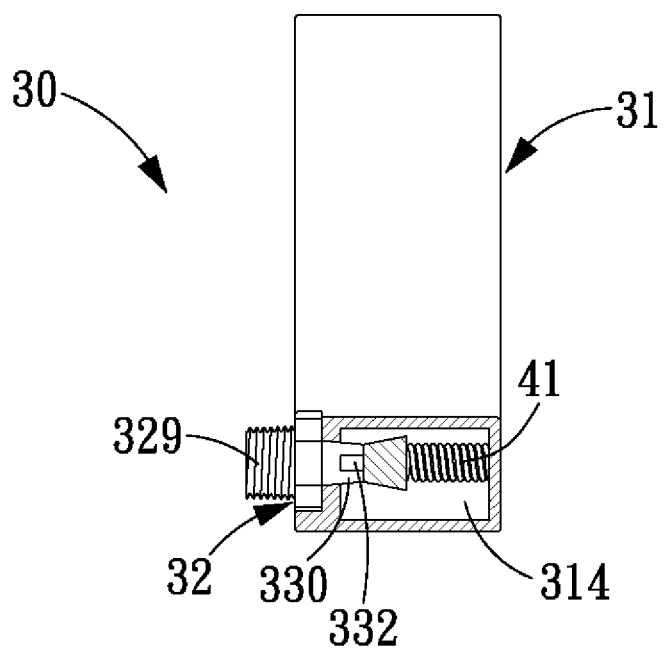
FIG. 9B shows that the connector is assembled to the oil tank which is provided with the spring plug.

FIG. 9A is an exploded cross sectional view in accordance with the present invention showing a connector and an oil tank which is provided with a spring plug and FIG. 9B shows that the connector is assembled to the oil tank which is provided with the spring plug. The penetrating hole 315 of the oil tank 31 of the oil-storage unit 30 is sealed with the spring plug 41. When the second end 330 of the connector 32 is inserted in the connecting end 313 of the oil tank 31, it will push the spring plug 41 away, so that the oil feeding hole 323 (as shown in FIG. 8) of the connector 32 is in communication with the oil-storage space 314 of the oil tank 31.

Figure 10A:
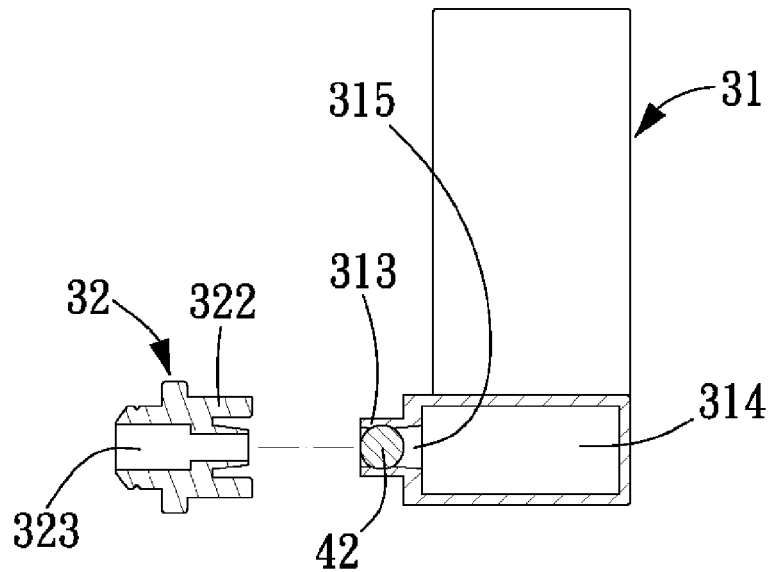
FIG. 10A is an exploded cross sectional view in accordance with the present invention showing a connector and an oil tank which is provided with a ball.
Figure 10B:
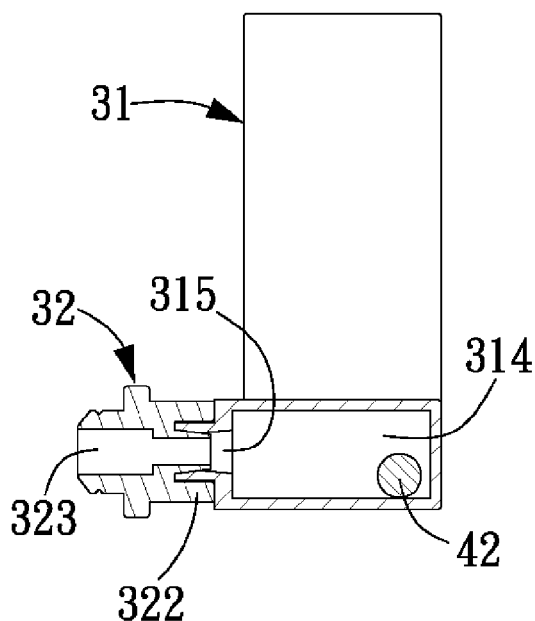
FIG. 10B shows that the connector is assembled to the oil tank which is provided with the ball.

FIG. 10A is an exploded cross sectional view in accordance with the present invention showing a connector and an oil tank which is provided with a ball and FIG. 10B shows that the connector is assembled to the oil tank which is provided with the ball. The penetrating hole 315 of the oil tank 31 of the oil-storage unit 30 is sealed with the ball 42. When the connector 32 is assembled to the oil tank 31, the second end 322 of the connector 32 will push the ball 42 away, so that the penetrating hole 315 of the oil tank 31 will be in communication with the oil feeding hole 323 of the connector 32.

Figure 13:
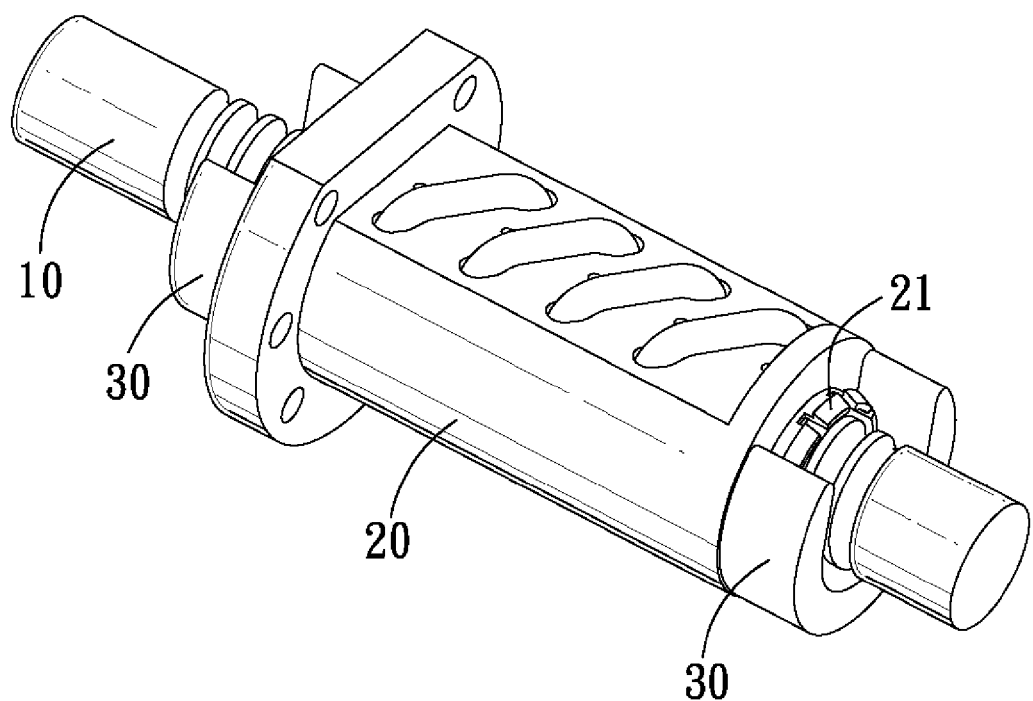
FIG. 13 is an assembly view of the present invention showing that two oil tanks are assembled at both ends of the nut.
Figure 14:
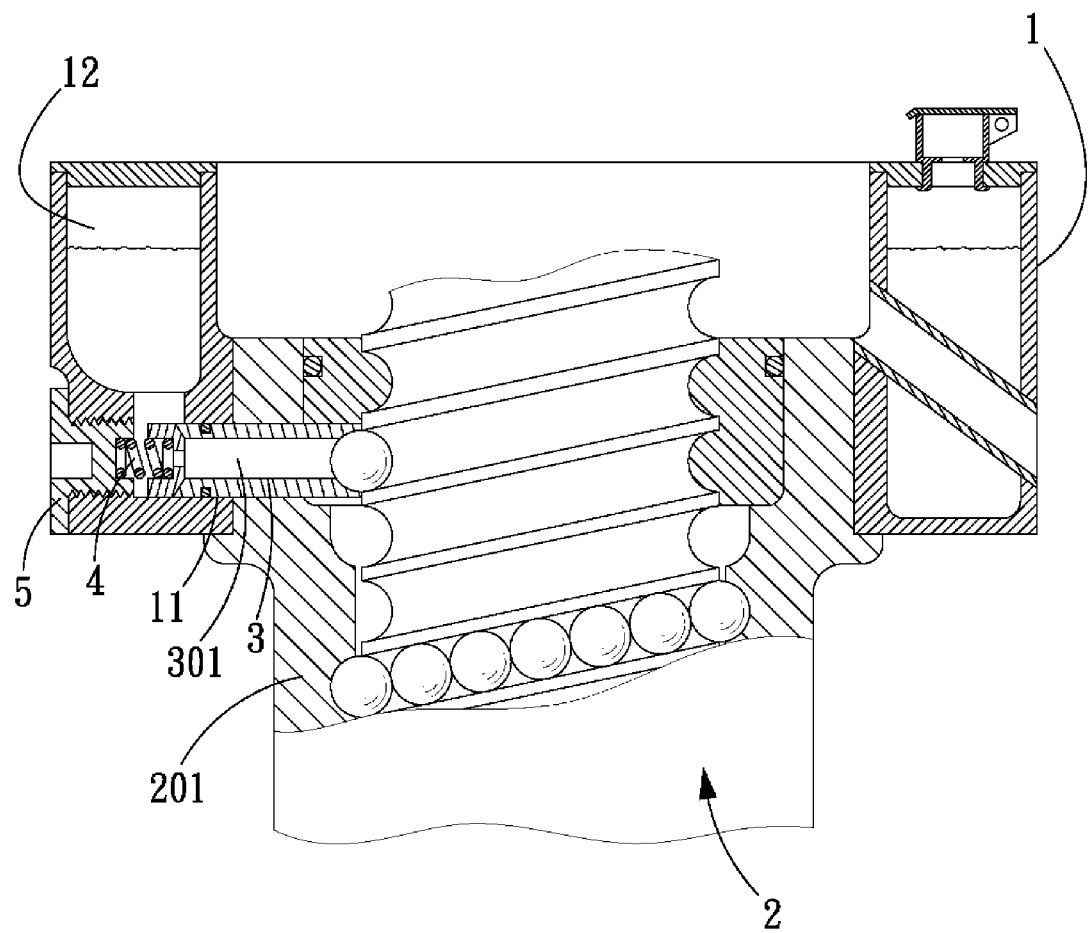
FIG. 14 shows a conventional ball screw with an oil-storage unit.
Figure 15:
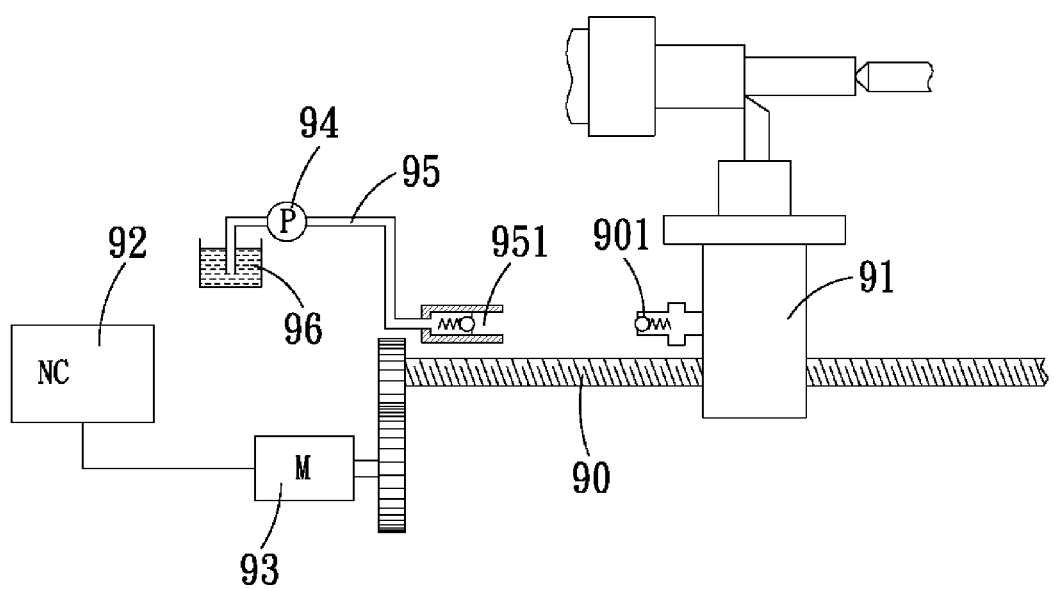
FIG. 15 shows another conventional ball screw with an oil-storage unit.

FIG. 13 is an assembly view of the present invention showing that two oil tanks are assembled at both ends of the nut, wherein the screw shaft 10 is formed with outer threads, and the nut 20 is screwed on the screw shaft 10. The nut 20 is provided with two oil-storage units 30 which are assembled at both ends of the nut 20. The nut 20 is provided with a plurality of hooks 21 arranged in annular fashion, or the nut 20 can be provided with two opposite hooks 21.

For easy observation, the oil tank 31 of the oil-storage unit 30 can be made of transparent or semi-transparent material, so that the oil level in the oil tank 31 is visible and it can also be observed whether the film 40, spring plug 41, ball 42 have been pierced through or pushed away to let the oil-storage space 314 of the oil tank 31 communicate with the fixing hole 202 of the nut 20.

It is to be noted that, as shown in FIG. 1, in addition to the fact that the fixing of the connector 32 to the oil tank 31 is achieved by the concave and convex engagement of the second end 322 of the connector 32 with the connecting end 313 of the oil tank 31, the two first positioning portions 316 on the oil tank 31 can also be engaged with two second positioning portions 22 of the nut 20 to enhance the reliability of the fixing between the connector 32 and the oil tank 31. Moreover, the oil tank 31 can be easily removed from the nut 20 by disengaging the first positioning portions 316 from the second positioning portions 22.

While we have shown and described various embodiments in accordance with the present invention, it is clear to those skilled in the art that further embodiments may be made without departing from the scope of the present invention.

What is claimed is:

1. A ball screw, comprising:
   a screw shaft extending in a direction to form an elongated structure, and the direction in which the screw shaft extending being defined as an axial direction;
   a nut formed with a threaded hole for enabling the nut to be screwed on the screw shaft, and a L-shaped fixing hole formed at an end surface of the nut, extending in the axial direction and being in communication with the threaded hole;
   an oil-storage unit including an oil tank and a connector, the oil tank including a mounting hole, a gap, a connecting end, and an oil-storage space, the mounting hole extends in the axial direction to penetrate the oil tank, and another direction normal to the axial direction being defined as a radial direction, the gap being formed by removing a radial part of the oil tank and in communication with the mounting hole, the gap having a width larger than an outer diameter of the screw shaft, the connecting end being in the form of a concave structure or a convex structure disposed at an end surface of the oil tank and formed in the axial direction with a penetrating hole in communication with the oil-storage space, the connector including a first end, a second end, and an oil feeding hole running through the first and second ends, the first end being inserted in the axial direction and into the fixing hole of the nut, and the second end being connected to the connecting end of the oil-storage unit, the oil-feeding hole having two ends in communication with the oil-storage space and the fixing hole, respectively;

wherein the second end of the connector is in the form of a convex structure or a concave structure for engaging with the connecting end of the oil tank, so as to fix the oil tank to the connector;

the oil tank is provided with two first positioning portions extending in the axial direction, and the nut is formed on an outer surface thereof with two second positioning portions for engaging with the first positioning portions.

2. The ball screw as claimed in claim 1, wherein the first positioning portions are hooks, and the second positioning portions are locking cavities.

3. The ball screw as claimed in claim 1, wherein the penetrating hole of the oil tank of the oil-storage unit is sealed with a film, and the second end of the connector will pierce through the film when it is inserted in the connecting end of the oil tank, so that the oil feeding hole of the connector is in communication with the oil-storage space of the oil tank.

4. The ball screw with an oil-storage unit as claimed in claim 1, wherein the first end of the connector is formed with outer threads for mating with inner threads formed in the fixing hole of the nut, so as to fix the connector to the nut.

5. The ball screw as claimed in claim 1, wherein the first end of the connector and the fixing hole of the nut are in the form of convex and concave structures for engaging with each other, so as to fix the connector to the nut.

6. The ball screw with an oil-storage unit as claimed in claim 1, wherein the second end of the connector is an annular concave structure, and the connecting end of the oil tank is an annular convex structure for mating with the second end of the connector.

7. The ball screw with an oil-storage unit as claimed in claim 1, wherein the second end of the connector is an annular convex structure, the connecting end of the oil tank is an annular concave structure for mating with the second end of the connector.

* * * * *